United States Patent
Kaneko et al.

(10) Patent No.: US 12,528,363 B2
(45) Date of Patent: Jan. 20, 2026

(54) CONTROL APPARATUS FOR VEHICLE, CONTROL SYSTEM FOR VEHICLE, AND CONTROL METHOD FOR VEHICLE

(71) Applicant: Hitachi Astemo, Ltd., Hitachinaka (JP)

(72) Inventors: Satoshi Kaneko, Hitachinaka (JP); Keisuke Suzuki, Hitachinaka (JP); Kazuya Takahashi, Sagamihara (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 280 days.

(21) Appl. No.: 17/859,289

(22) Filed: Jul. 7, 2022

(65) Prior Publication Data
US 2022/0340018 A1 Oct. 27, 2022

Related U.S. Application Data

(63) Continuation of application No. 16/637,683, filed as application No. PCT/JP2018/026157 on Jul. 11, 2018, now abandoned.

(30) Foreign Application Priority Data

Aug. 9, 2017 (JP) ................. 2017-153896

(51) Int. Cl.
*B60L 15/20* (2006.01)
*B60T 8/175* (2006.01)
(Continued)

(52) U.S. Cl.
CPC .............. *B60L 15/20* (2013.01); *B60T 8/175* (2013.01); *B60W 10/08* (2013.01);
(Continued)

(58) Field of Classification Search
CPC ...... B60T 8/175; B60T 8/1755; B60T 8/1764; B60T 8/505; B60T 2201/14;
(Continued)

(56) References Cited

U.S. PATENT DOCUMENTS

| 4,966,248 A | 10/1990 | Farr |
| 4,981,190 A | 1/1991 | Nakayama |

(Continued)

FOREIGN PATENT DOCUMENTS

| DE | 102013002890 A1 | 8/2014 |
| DE | 102015212948 A1 * | 1/2017 |

(Continued)

OTHER PUBLICATIONS

EPO machine translation DE 102015212948 A1 (original DE publication filed Jan. 12, 2017) (Year: 2017).*

(Continued)

*Primary Examiner* — David A Testardi
(74) *Attorney, Agent, or Firm* — Crowell & Moring LLP

(57) ABSTRACT

A control apparatus for a vehicle includes an addition portion that outputs a post-compensation driver request torque, which is acquired by adding a driving torque (a loss compensation driving torque) lost due to a braking torque provided to a wheel on a low-μ road surface side according to a BLSD request hydraulic pressure calculated by a BLSD request hydraulic pressure calculation processing portion to a driver request torque calculated by a driver request torque calculation processing portion, to a motor.

14 Claims, 12 Drawing Sheets

(51) Int. Cl.
  *B60W 10/08* (2006.01)
  *B60W 10/184* (2012.01)
  *B60W 30/18* (2012.01)

(52) U.S. Cl.
  CPC .... *B60W 10/184* (2013.01); *B60W 30/18172* (2013.01); *B60L 2240/423* (2013.01); *B60L 2240/465* (2013.01); *B60T 2210/12* (2013.01); *B60W 2540/12* (2013.01); *B60W 2552/40* (2020.02); *B60W 2710/083* (2013.01); *B60W 2710/18* (2013.01)

(58) Field of Classification Search
  CPC ......... B60T 2210/124; B60T 2270/208; B60T 2270/213; B60W 30/18027; B60W 30/18172; B60W 2250/266; B60Y 2300/18025; B60K 28/16; B60L 15/20
  See application file for complete search history.

(56) References Cited

U.S. PATENT DOCUMENTS

| | | | |
|---|---|---|---|
| 4,982,807 A | 1/1991 | Hilburger | |
| 6,533,367 B1 * | 3/2003 | Latarnik | B60T 8/175 303/113.2 |
| 6,663,536 B1 | 12/2003 | Meier | |
| 8,645,041 B2 | 2/2014 | Ishida et al. | |
| 2002/0195873 A1 | 12/2002 | Fawkes | |
| 2003/0150660 A1 * | 8/2003 | Ohtsu | B60K 23/0808 180/197 |
| 2003/0214181 A1 | 11/2003 | Polzin | |
| 2004/0176899 A1 | 9/2004 | Hallowell | |
| 2006/0100766 A1 * | 5/2006 | Schwarz | B62D 6/003 701/70 |
| 2006/0185914 A1 | 8/2006 | Hommi | |
| 2007/0244620 A1 | 10/2007 | Drenth | |
| 2008/0147273 A1 * | 6/2008 | Bauer | B60T 8/1755 701/41 |
| 2009/0024294 A1 * | 1/2009 | Ishida | B60W 10/184 701/87 |
| 2009/0107748 A1 | 4/2009 | Luehrsen | |
| 2010/0056338 A1 | 3/2010 | Erban | |
| 2010/0114447 A1 | 5/2010 | Moriki | |
| 2012/0078483 A1 | 3/2012 | Yajima et al. | |
| 2012/0259523 A1 * | 10/2012 | Dehren | B60W 10/16 701/69 |
| 2014/0025241 A1 | 1/2014 | Andou | |
| 2015/0239442 A1 * | 8/2015 | Yamakado | B60T 8/17555 701/70 |
| 2015/0284005 A1 | 10/2015 | Suzuki | |
| 2016/0185350 A1 | 6/2016 | Kelly | |
| 2016/0214486 A1 | 7/2016 | Suzuki | |
| 2017/0001644 A1 | 1/2017 | Hartman | |
| 2017/0174192 A1 | 6/2017 | Ying | |
| 2018/0362022 A1 * | 12/2018 | Kasaiezadeh Mahabadi | B60W 30/045 |

FOREIGN PATENT DOCUMENTS

| | | | | |
|---|---|---|---|---|
| JP | 5-125970 A | 5/1993 | | |
| JP | 2007023979 A | 2/2007 | | |
| JP | 2007209068 A | 8/2007 | | |
| JP | 2008-296828 A | 12/2008 | | |
| JP | 2009255845 A | 11/2009 | | |
| JP | 2010-221917 A | 10/2010 | | |
| JP | 2012-66785 A | 4/2012 | | |
| JP | 2015020626 A | 2/2015 | | |
| WO | WO-2018121601 A1 * | 7/2018 | | B60L 3/10 |

OTHER PUBLICATIONS

2015 Nissan Quest Service Manual, Section BRC, Brake Control System, 127 pages (Year: 2015).*
International Search Report (PCT/ISA/210) issued in PCT Application No. PCT/JP2018/026157 dated Sep. 11, 2018 with English translation (three (3) pages).
Japanese-language Written Opinion (PCT/ISA/237) issued in PCT Application No. PCT/JP2018/026157 dated Sep. 11, 2018 with English Translation (seven (7) pages).
Extended European Search Report issued in European Application No. 18843963.2 dated Jul. 22, 2002 (nine (9) pages).
Rudd, Robert, "Estimating the Mu Slip Curve via Extended Kalman Filtering", The Mathematica Journal 11 :1 © 2008 Wolfram Media, Inc., pp. 91 to 106. (Year: 2008).
EPO machine translation of DE 102015212948 (original DE document published Jan. 12, 2017) (Year: 2017).
Van Zanten, Anton T., "Evolution of electronic control systems for improving the vehicle dynamic behavior." Proceedings of the 6th International Symposium on Advanced Vehicle Control. vol. 2. No. 2, 2002, 9 pages (Year: 2002).
Mohan, S.K. et al., "24—Tribology of differentials and traction control devices", from, Tribology and Dynamics of Engine and Powertrain, Editor(s): Homer Rahnejat, Woodhead Publishing, 2010, pp. 735-772 (Year: 2010).
Kang, Mingxin et al., "Coordinated vehicle traction control based on engine torque and brake pressure under complicated road conditions", Vehicle System Dynamics, vol. 50 No. 9, Sep. 2012, pp. 1473-1494 (Year: 2012).

* cited by examiner

CONTROL APPARATUS FOR VEHICLE, CONTROL SYSTEM FOR VEHICLE, AND CONTROL METHOD FOR VEHICLE

CROSS-REFERENCE

This application is a continuation of U.S. patent application Ser. No. 16/637,683, filed Feb. 7, 2020, which is a 371 of International Application No. PCT/JP2018/026157, filed Jul. 11, 2018, which claims priority from Japanese Patent Application No. 2017-153896, filed Aug. 9, 2017, the disclosures of which are expressly incorporated by reference herein.

TECHNICAL FIELD

The present invention relates to a control apparatus for a vehicle, a control system for a vehicle, and a control method for a vehicle.

BACKGROUND ART

PTL 1 discloses a technique that, when a difference in a target driving torque between left and right driving wheels matches or exceeds a driver request torque according to an accelerator operation amount on a split road surface, limits an upper limit value on the difference in the target driving torque according to the driver request torque.

CITATION LIST

Patent Literature

[PTL 1] Japanese Patent Application Public Disclosure No. 2008-296828 A

SUMMARY OF INVENTION

Technical Problem

However, the above-described patent literature, PTL 1 raises such a problem that an output of a driving source that provides driving torques to the driving wheels is limited according to the driver request torque, which makes it impossible to acquire a longitudinal acceleration of the vehicle that is requested by the driver on the split road surface.

Solution to Problem

One of objects of the present invention is to provide a control apparatus for a vehicle, a control system for a vehicle, and a control method for a vehicle capable of preventing the reduction in the longitudinal acceleration on the split road surface.

According to one aspect of the present invention, a control apparatus for a vehicle calculates a request driving torque of the vehicle based on an accelerator operation, and outputs the request driving torque after adding a driving torque lost due to a braking torque provided to a first driving wheel by a brake apparatus thereto on a split road surface on which a frictional coefficient of a road surface where the first driving wheel contacts a ground is lower than a frictional coefficient of a road surface where a second driving wheel contacts the ground.

Therefore, according to the control apparatus for the vehicle according to the one aspect of the present invention, it is possible to prevent the reduction in the longitudinal acceleration on the split road surface.

DESCRIPTION OF EMBODIMENTS

First Embodiment

Figure 1:
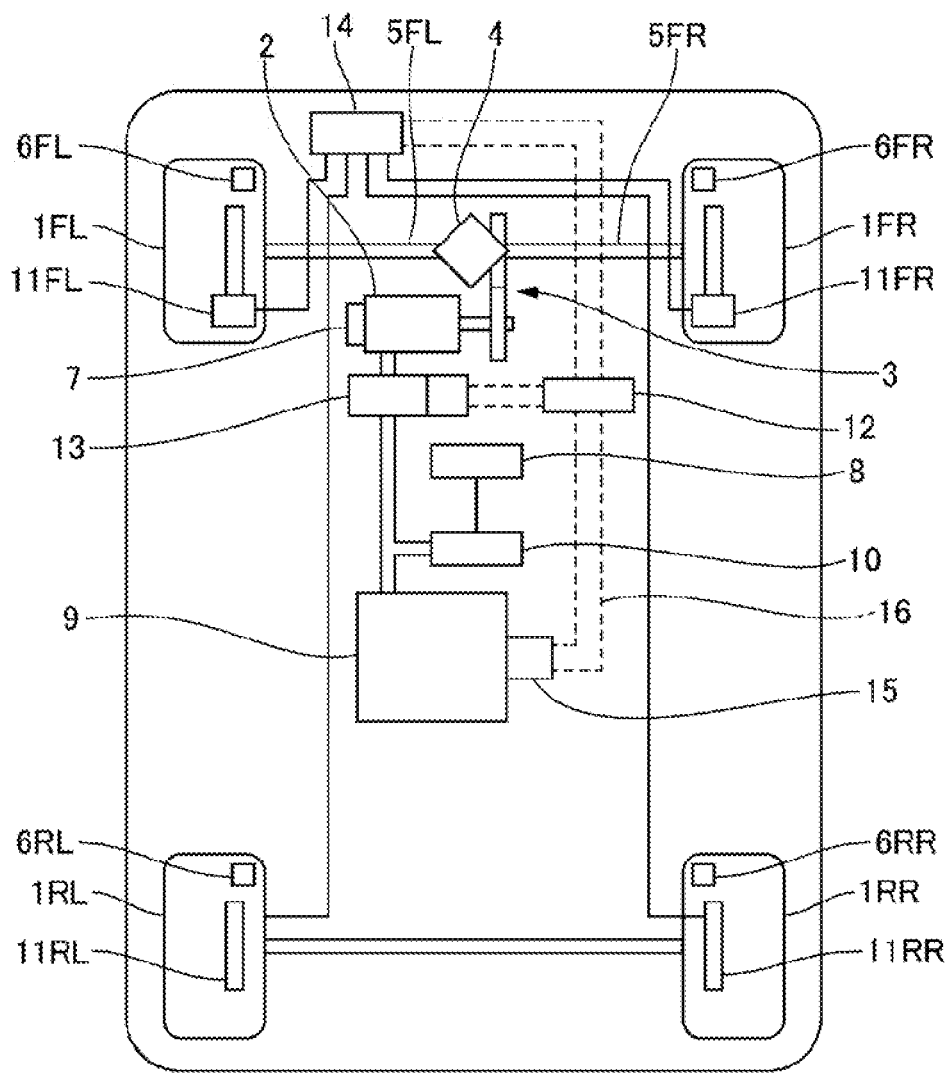
FIG. 1 illustrates a control system of an electric vehicle according to a first embodiment.

FIG. 1 illustrates a control system of an electric vehicle according to a first embodiment.

The electric vehicle according to the first embodiment includes front wheels 1FL and 1FR working as driving wheels and rear wheels 1RL and 1RR working as driven wheels, and includes an electric motor (hereinafter referred to as a motor) 2 as a driving source that provides driving torques to the front wheels 1FL and 1FR. Power is transmitted between the motor 2 and the front wheels 1FL and 1FR via a reducing gear 3, a differential gear 4, and driving axles 5FL and 5FR. The wheels 1FL, 1FR, 1RL, and 1RR include wheel speed sensors 6FL, 6FR, 6RL, and 6RR, which detect wheel speeds, respectively. The motor 2 includes a resolver 7, which detects a rotational speed of the motor. The vehicle includes a low-voltage battery 8 and a high-voltage battery 9. The low-voltage battery 8 is, for example, a lead storage battery. The high-voltage battery 9 is, for example, a lithium ion battery or a nickel hydrogen battery. The high-voltage battery 9 is charged by electric power after a voltage of the electric power is increased by a DC-DC converter 10. The wheels 1FL, 1FR, 1RL, and 1RR include hydraulic brake units 11FL, 11FR, 11RL, and 11RR as brake apparatuses, respectively. The brake units 11FL, 11FR, 11RL, and 11RR provide braking torques to the wheels 1FL, 1FR, 1RL, and 1RR corresponding thereto according to supplied brake hydraulic pressures (wheel cylinder hydraulic pressures), respectively.

The electric vehicle includes a vehicle control apparatus (a control unit) 12, a motor control apparatus 13, a brake control apparatus 14, and a battery control apparatus 15. These control apparatuses 12, 13, 14, and 15 share information with one another via a CAN bus 16. The vehicle control apparatus 12 inputs information from various kinds of sensors and comprehensively controls the vehicle. The vehicle control apparatus 12 calculates a request driving torque of the vehicle according to a driver's accelerator operation or the like, and calculates a request torque that the motor 2 should output to realize the request driving torque. Further, the vehicle control apparatus 12 calculates a request braking force of the vehicle according to a driver's brake operation or the like, and calculates a request hydraulic pressure that should be supplied to each of the brake units 11FL, 11FR, 11RL, and 11RR for realizing the request braking force. The motor control apparatus 13 controls electric power to supply to the motor 2 based on the request torque. The brake control apparatus 14 controls brake fluid to supply to each of the brake units 11FL, 11FR, 11RL, and 11RR based on the request hydraulic pressure. The battery control apparatus 15 monitors a charging/discharging state of the high-voltage battery 9 and a battery cell forming the high-voltage battery 9. The battery control apparatus 15 calculates a battery request torque limit value based on the charging/discharging state of the high-voltage battery 9 or the like. The battery request torque limit value is a maximum torque allowed with respect to the motor 2. For example, when the charging amount of the high-voltage battery 9 reduces, the battery request torque limit value is set to a smaller value than normal.

The vehicle control apparatus 12 performs slip control of preventing a driving slip by reducing the output torque of the motor 2 when the driving slip has occurred on one of the front wheels 1FL and 1FR, which are the driving wheels. The vehicle control apparatus 12 calculates a slip control target wheel speed using a difference between a wheel speed (a driving wheel speed) and a vehicle speed as a threshold value. The vehicle speed is, for example, assumed to be an average value of the wheel speeds of the rear wheels 1RL and 1RR, which are the driven wheels. The vehicle control apparatus 12 calculates a slip control torque for acquiring the slip control target wheel speed, and outputs the slip control torque to the motor control apparatus 13 as a request torque.

Further, when a difference is generated between the speeds of the front wheels 1FL and 1FR while the vehicle is running on a split road surface or the like, the vehicle control apparatus 12 performs brake LSD (BLSD) control of applying the braking force to one of the front wheels 1FL and 1FR that rotates at a higher speed (a slip wheel), and increasing the driving torque on the other of them that rotates at a lower speed (a non-slip wheel). The split road surface refers to a road surface on which a frictional coefficient is different between left and right wheels. The frictional coefficient refers to a ratio between a frictional force working between a tire and a road surface where the tire contacts the ground and a pressure vertically applied to the road surface where the tire contacts the ground. The vehicle control apparatus 12 calculates a BLSD target wheel speed of the slip wheel for reducing the difference between the rotational speeds of the front wheels 1FL and 1FR to the threshold value or smaller, and calculates a BLSD request hydraulic pressure of the slip wheel for acquiring the BLSD target wheel speed. The vehicle control apparatus 12 outputs the BLSD request hydraulic pressure to the brake control apparatus 14 as a request hydraulic pressure.

Now, providing the braking torque to the slip wheel by the BLSD control cancels out a part of the driving torque on the slip wheel by this braking torque, thereby reducing the driving torque on the vehicle to lower than the request driving torque. Therefore, the longitudinal acceleration of the vehicle does not reach the longitudinal acceleration requested by the driver, and therefore the driver is forced to engage in an operation of additionally pressing the accelerator pedal.

In the first embodiment, with the aim of preventing the reduction in the longitudinal acceleration along with the BLSD control on the split road surface, the vehicle control apparatus 12 performs request driving torque correction control of generating a higher driving torque than the request driving torque in parallel with the BLSD control. In the following description, details of the request driving torque correction control will be described.

Figure 2:
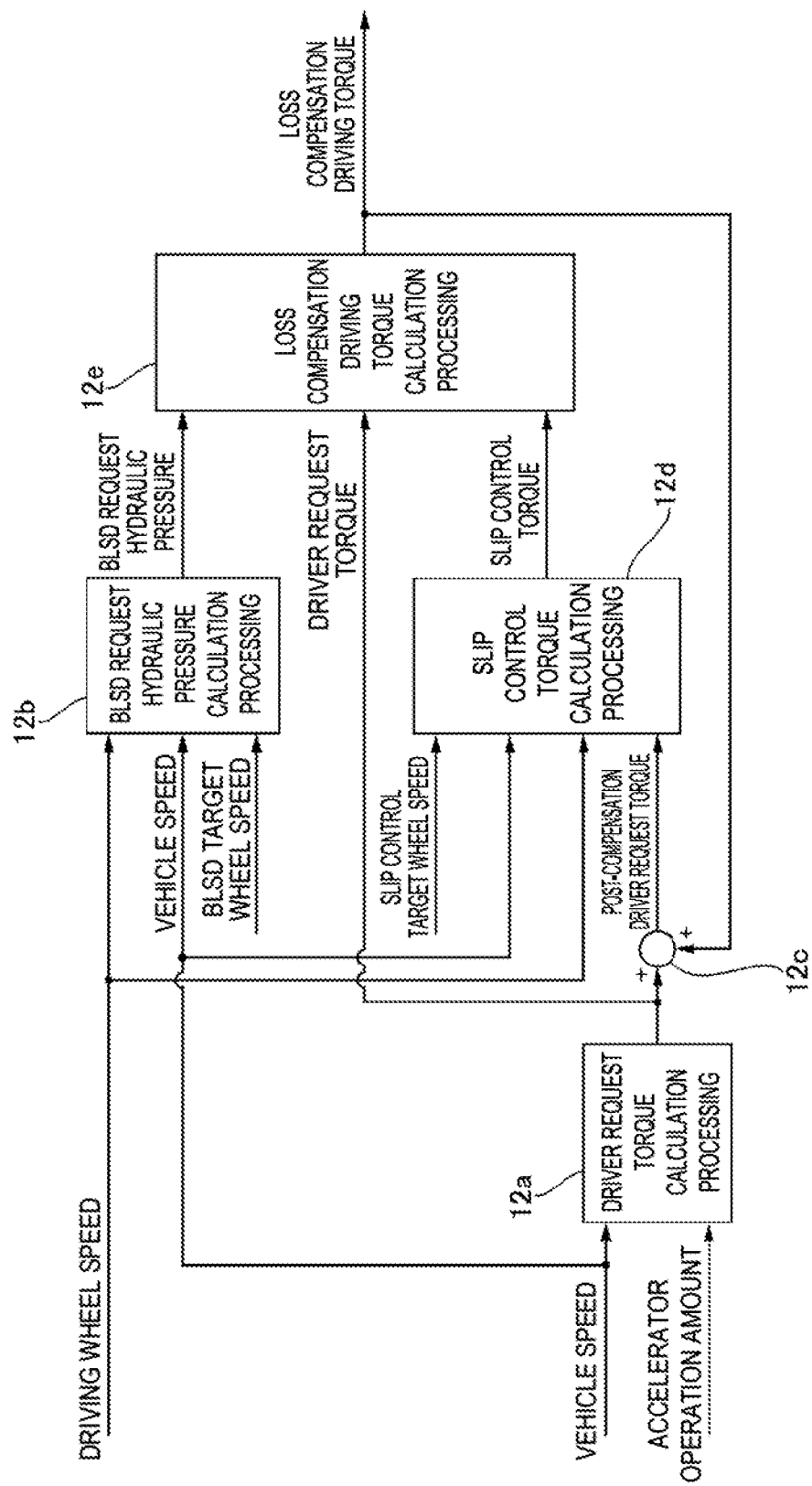
FIG. 2 is a control block diagram of a vehicle control apparatus 12 according to the first embodiment.

FIG. 2 is a control block diagram of the vehicle control apparatus 12 according to the first embodiment.

A driver request torque calculation processing portion (a request driving torque calculation portion) 12a calculates the driver request torque (the request driving torque) by referring to a map based on the accelerator operation amount and the vehicle speed (a request driving torque calculation step).

A BLSD request hydraulic pressure calculation processing portion (a frictional brake calculation portion) 12b calculates the BLSD request hydraulic pressure for causing the wheel speed of the slip wheel to match the BLSD target wheel speed based on the speed of the driving wheel (the wheel speed of the slip wheel), the wheel speed, and the BLSD target wheel speed (a frictional brake calculation step).

An addition portion (a correction request driving torque output portion) 12c calculates a post-compensation driver request torque by adding a loss compensation driving torque (a correction request driving torque), which will be described below, to the driver request torque (a correction request driving torque output step).

A slip control torque calculation processing portion (a slip control portion) 12d calculates a slip control torque for causing the driving torque of the vehicle to match the post-compensation driver request torque while converging the wheel speeds of the front wheels 1FL and 1FR to the slip control target wheel speed based on the slip control target wheel speed, the vehicle speed, the driving wheel speed, and the post-compensation driver request torque.

Figure 3:
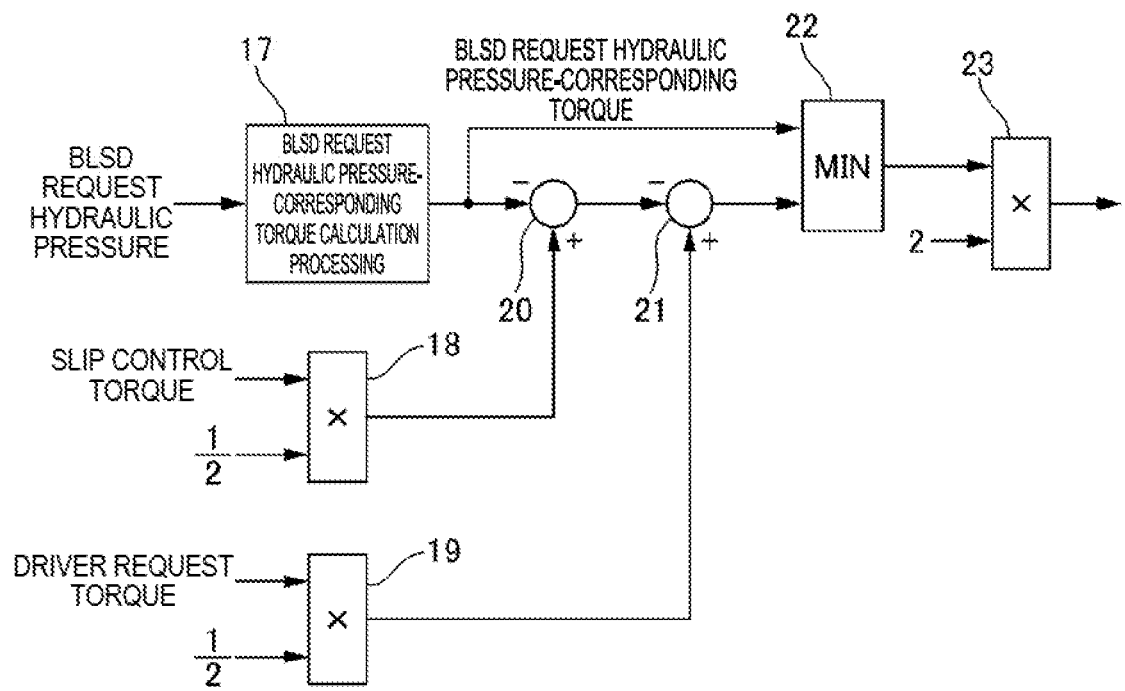
FIG. 3 is a control block diagram of a loss compensation driving torque calculation processing portion 12e.

A loss compensation driving torque calculation processing portion 12e calculates the loss compensation driving torque based on the BLSD request hydraulic pressure, the driver request torque, and the slip control torque. FIG. 3 illustrates a control block diagram of the loss compensation driving torque calculation processing portion 12e.

A BLSD request hydraulic pressure-corresponding torque calculation processing portion 17 calculates a BLSD request hydraulic pressure-corresponding torque, which is a braking torque converted from the BLSD request hydraulic pressure.

A multiplication portion 18 calculates a slip control torque for one wheel (for the slip wheel) by dividing the slip control torque in half.

A multiplication portion 19 calculates a driver request torque for one wheel (for the slip wheel) by dividing the driver request torque in half.

A comparison portion 20 subtracts the BLSD request hydraulic pressure-corresponding torque from the slip control torque.

A comparison portion 21 subtracts an output of the comparison portion 20 (the slip control torque—the BLSD request hydraulic pressure-corresponding torque) from the driver request torque.

A limit portion (a first limiter processing portion) 22 sets a value selected by selecting the lower one of the outputs of the BLSD request hydraulic pressure-corresponding torque and the comparison portion 21 as the loss compensation driving torque (first limiter processing step).

A multiplication portion 23 calculates a loss compensation driving torque for the two wheels by doubling the loss compensation driving torque.

Next, a general concept of the control of the correction of the request driving torque according to the first embodiment will be described based on a specific example thereof.

Figure 4:
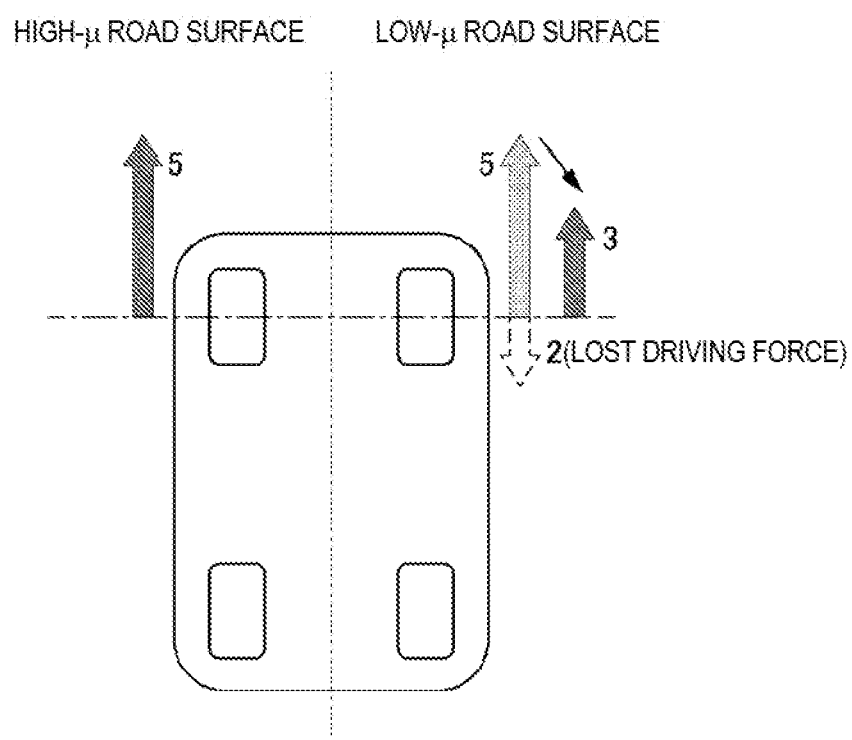
FIG. 4 illustrates driving torques on front wheels in a case where request driving torque correction control is not performed when BLSD control is actuated on a split road surface.

FIG. 4 illustrates the driving torques on front wheels in a case where the request driving torque correction control is not performed when the BLSD control is actuated on the split road surface. Suppose that the split road surface is a low-μ road surface on the front right wheel side and is a high-μ road surface on the front left wheel side.

When the vehicle enters the split road surface and the BLSD control is actuated, the braking torque is provided to the front right wheel on the low-μ road surface side. Due to the BLSD control, the driving torque on the front left wheel on the high-μ road surface side recovers to 5, which is similar to on the high-μ even road surface. However, the driving torque is partially canceled out by the provision of the braking torque to the front right wheel, and therefore the driving torque on the front right wheel reduces to 3, which is a value acquired by subtracting 2 corresponding to the loss due to the BLSD control (the lost driving torque) from 5. Therefore, the driving torque on the vehicle ends up 5+3=8 (a sum of the driving torques on the front left and right wheels) while the driver request torque is 10, thereby failing to achieve the longitudinal acceleration of the vehicle according to the accelerator operation amount. Therefore, the driver should additionally press the accelerator pedal to compensate for the insufficiency of the longitudinal acceleration.

Figure 5:
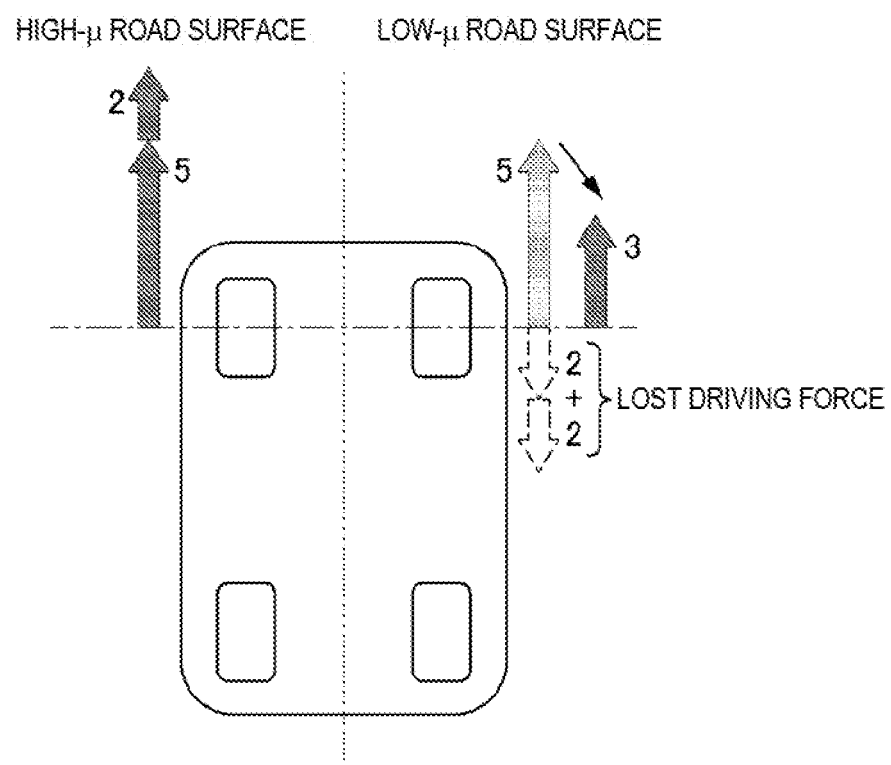
FIG. 5 illustrates driving torques on the front wheels in a case where the request driving torque correction control is performed when the BLSD control is actuated on the split road surface.

FIG. 5 illustrates the driving torques on the front wheels in a case where the request driving torque correction control is performed when the BLSD control is actuated on the split road surface. Suppose that the split road surface is the low-μ road surface on the front right wheel side and is the high-μ road surface on the front left wheel side.

In the request driving torque correction control, the motor 2 is controlled so as to generate the post-compensation driver request torque 10+4=14, which is a value acquired by adding the loss compensation driving torque 2×2=4 for compensating for the lost driving torque of 2 due to the BLSD control to the driver request torque of 10. As a result, although the driving torque is kept at 3 on the front right wheel, on which a tire longitudinal force is saturated, the driving torque increases from 5 to 5+2=7 on the front left wheel, on which the tire longitudinal force is not saturated, so that the driving torque on the vehicle recovers to 7+3=10. Therefore, the vehicle control apparatus 12 can achieve the driving torque on the vehicle that matches the driver request torque. As a result, the vehicle control apparatus 12 can realize the acceleration of the vehicle that is desired by the driver without forcing the driver to engage in the operation of additionally pressing the accelerator pedal on the split road surface.

Figure 6:
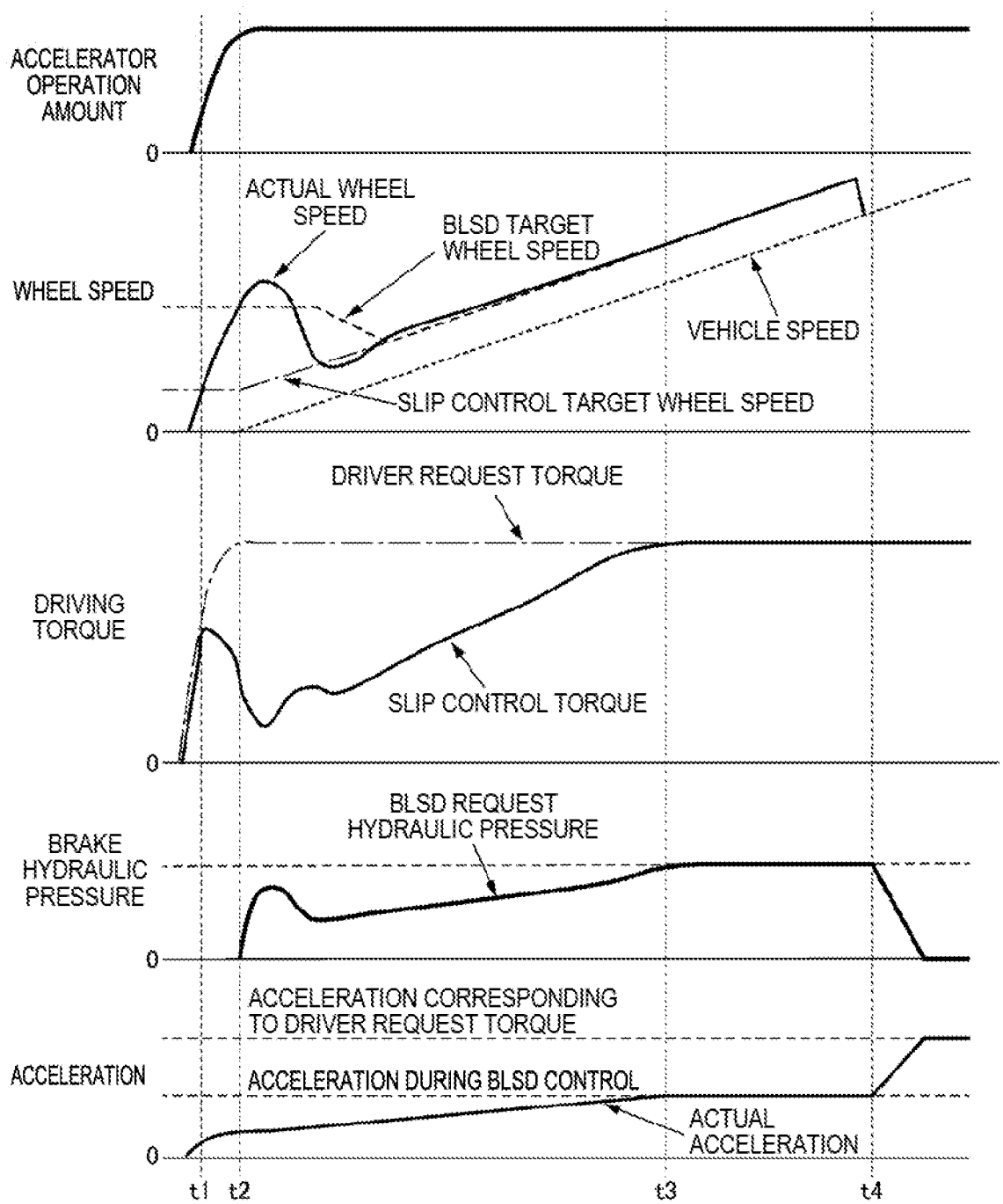
FIG. 6 is a timing chart in a case where the request driving torque correction control according to the first embodiment is not performed when the vehicle starts running on the split road surface.

FIG. 6 is a timing chart in a case where the request driving torque correction control according to the first embodiment is not performed when the vehicle starts running on the split road surface. Suppose that the split road surface is the low-μ road surface on the front right wheel side and is the high-μ road surface on the front left wheel side.

At time t1, the slip control is started because an actual wheel speed of the front right wheel exceeds the slip control target wheel speed. The difference between the driver request torque and the slip control torque starts increasing.

At time t2, the BLSD control is started because the difference in the rotational speed between the front left and right wheels exceeds the BLSD target wheel speed. Because the BLSD request hydraulic pressure rises and the braking torque is provided to the front right wheel, the actual wheel speed of the front right wheel is converged to the slip control target wheel speed, and the slip control torque increases toward the driver request torque.

At time t3, the slip control torque reaches the driver request torque, but the driving torque on the front right wheel reduces by an amount corresponding to the loss due to the BLSD control, so that the longitudinal acceleration of the vehicle is kept at an acceleration that would be reached when the BLSD control is still in progress, which is lower than the acceleration corresponding to the driver request torque according to the accelerator operation amount, failing to realize the longitudinal acceleration according to the accelerator operation amount.

At time t4, the vehicle exits the split road surface and enters the high-μ even road surface, and therefore the BLSD request hydraulic pressure starts reducing. The longitudinal acceleration of the vehicle starts increasing toward the acceleration corresponding to the driver request torque.

Figure 7:
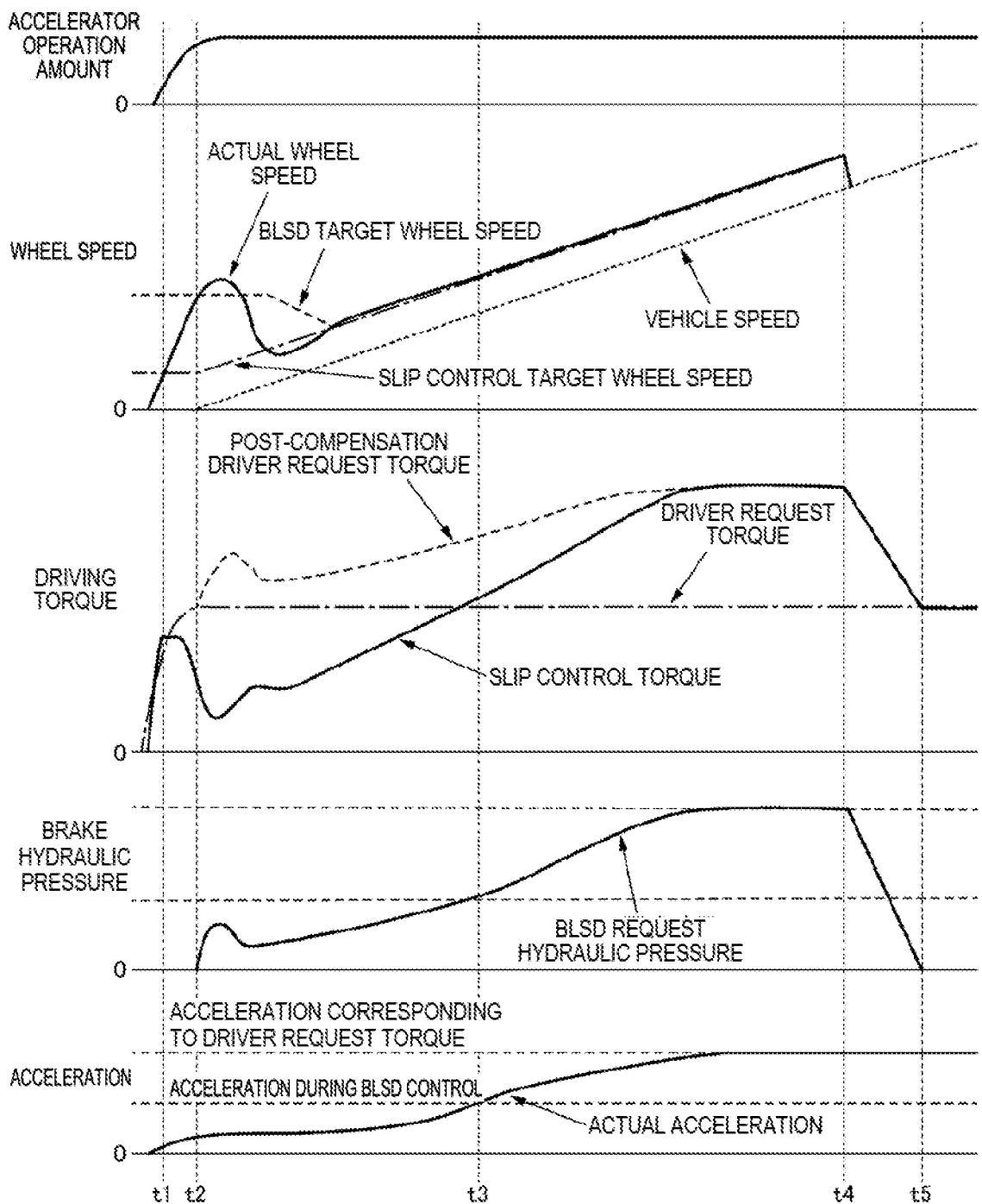
FIG. 7 is a timing chart in a case where the request driving torque correction control according to the first embodiment is performed when the vehicle starts running on the split road surface.

FIG. 7 is a timing chart in a case where the request driving torque correction control according to the first embodiment is performed when the vehicle starts running on the split road surface. Suppose that the split road surface is the low-μ road surface on the front right wheel side and is the high-μ road surface on the front left wheel side.

The timing chart exhibits the same content as in FIG. 6 during a period since time t1 to time t2.

At time t2, the request driving torque correction control is started at the same time as the start of the BLSD control. In the request driving torque correction control, the driving torque canceled out due to the BLSD control on the wheel on the low-μ road surface side (the front right wheel) is compensated for by the driving torque on the wheel on the high-μ road surface side (the front left wheel), so that the post-compensation driver request torque is calculated by adding the driving torque corresponding to the driving torque canceled out on the front right wheel (the loss compensation driving torque) to the driver request torque determined based on an accelerator position after the BLSD control is started. The post-compensation driver request torque increases until the sum of the driving torques on the front left and right wheels reaches the driver request torque. The slip control torque is calculated based on the post-compensation driver request torque.

At time t3, the slip control torque exceeds the driver request torque, but does not reach the post-compensation driver request torque. Therefore, the slip control torque further continues increasing. After the slip control torque reaches the post-compensation driver request torque, the longitudinal acceleration of the vehicle reaches the acceleration corresponding to the driver request torque according to the accelerator operation amount.

At time t4, the vehicle exits the split road surface and enters the high-μ even road surface, and therefore the BLSD request hydraulic pressure gradually reduces. According thereto, the post-compensation driver request torque and the slip control torque reduce.

At time t5, the BLSD request hydraulic pressure reaches zero and the slip control torque matches the driver request torque, so that the vehicle returns to the same state as the running state on the high-μ even road surface.

Figure 8:
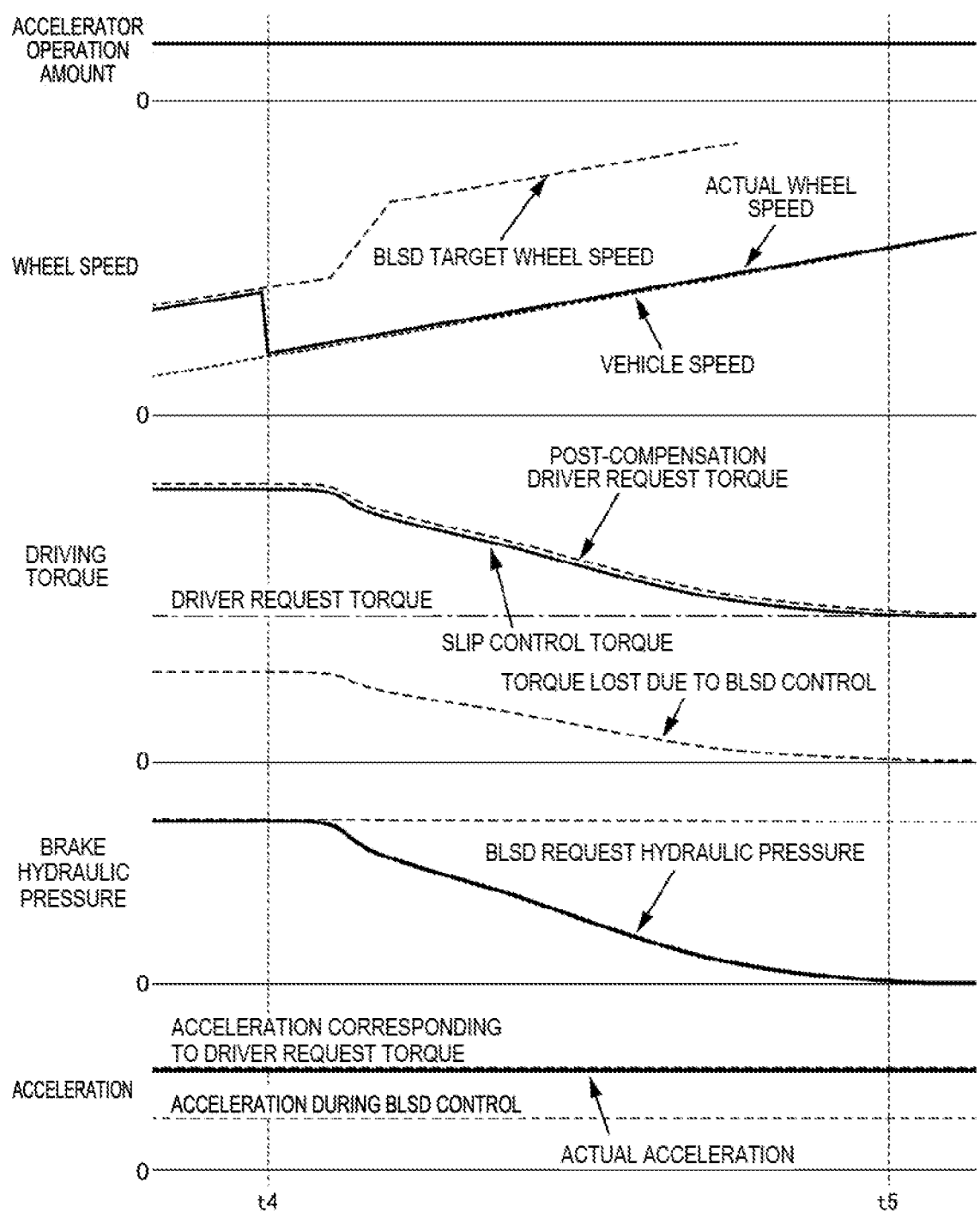
FIG. 8 is a timing chart during a period from time t4 to time t5 illustrated in FIG. 7.

Next, a method for reducing the BLSD request hydraulic pressure and the post-compensation driver request torque in a period from time t4 to time t5 will be described. FIG. 8 is a timing chart during a period from time t4 to time t5 illustrated in FIG. 7.

When the speed difference between the front wheels 1FL and 1FR is converged and the BLSD control is ended due to the movement from the split road surface to the high-μ even road surface, the vehicle control apparatus 12 reduces the BLSD request hydraulic pressure and the post-compensation driver request torque at such a gradient that the longitudinal acceleration of the vehicle hardly changes and a vibration is hardly generated on the driving system. At time t4, the wheel speed of the front right wheel considerably falls below the BLSD target wheel speed due to the entry into the high-μ road surface. Then, when the BLSD control is determined to be turned off, the BLSD request hydraulic pressure reduces based on the BLSD control, but the vehicle control apparatus 12 still reduces the post-compensation driver request torque to the driver request torque in the request driving torque correction control. At this time, the vehicle control apparatus 12 reduces the loss compensation driving torque in such a manner that a reduced amount of the post-compensation driver request torque is kept in phase with a reduced amount of the lost torque generated according to the BLSD request hydraulic pressure (the lost torque due to the BLSD control). The vehicle control apparatus 12 can reduce a change amount of the acceleration by reducing the post-compensation driver request torque and the BLSD request hydraulic pressure in phase with each other. However, the reduced amounts do not have to be equal to each other. The BLSD request hydraulic pressure calculation processing portion 12b reduces the BLSD request hydraulic pressure at a predetermined gradient when the wheel speed of the slip wheel considerably falls below the BLSD target wheel speed. The loss compensation driving torque calculation processing portion 12e reduces the loss compensation driving torque at a predetermined gradient according to the reduction in the BLSD request hydraulic pressure. As a result, the vehicle control apparatus 12 can control the reduced amount of the post-compensation driver request torque according to the reduced amount of the BLSD request hydraulic pressure. Alternatively, the reduced amount of the BLSD request hydraulic pressure may be controlled according to the reduced amount of the post-compensation driver request torque.

Figure 9:
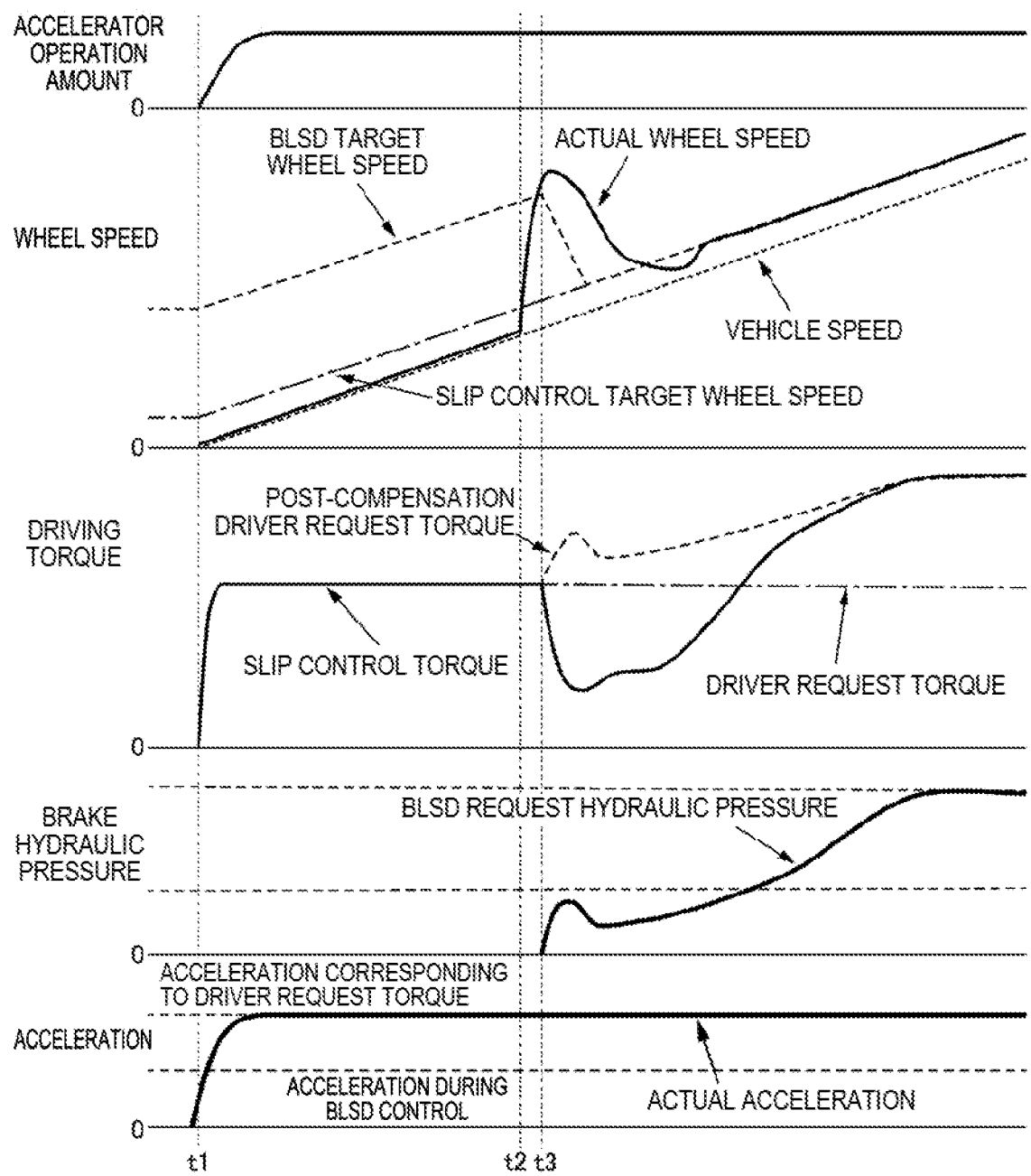
FIG. 9 is a timing chart in a case where the request driving torque correction control according to the first embodiment is performed when the vehicle moves onto the split road surface after starting running on a high-μ even road surface.

FIG. 9 is a timing chart in a case where the request driving torque correction control according to the first embodiment is performed when the vehicle moves onto the split road surface after starting running on the high-μ even road surface. Suppose that the split road surface is the low-μ road surface on the front right wheel side and is the high-μ road surface on the front left wheel side.

At time t1, the driver starts the accelerator operation and the driver request torque rises, so that the wheel speed of the front right wheel increases and the longitudinal acceleration of the vehicle reaches the acceleration corresponding to the driver request torque.

At time t2, the vehicle exits the high-μ even road surface and enters the slip road surface, thereby triggering a start of the slip control.

At time t3, the request driving torque correction control is started at the same time as the start of the BLSD control, so that the post-compensation driver request torque is set to the value acquired by adding the loss compensation driving torque to the driver request torque. As a result, the vehicle control apparatus 12 can keep the longitudinal acceleration of the vehicle at the acceleration corresponding to the driver request torque even when the vehicle moves from the high-μ even road surface to the split road surface.

The first embodiment brings about the following advantageous effects.

(1) The vehicle control apparatus 12 includes the addition portion 12c that outputs the post-compensation driver request torque, which is acquired by adding the driving torque (the loss compensation driving torque) lost due to the braking torque provided to the wheel on the low-μ road surface side according to the BLSD request hydraulic pressure calculated by the BLSD request hydraulic pressure calculation processing portion 12b to the driver request torque calculated by the driver request torque calculation processing portion 12a, to the motor 2.

As a result, the vehicle control apparatus 12 can prevent the reduction in the longitudinal acceleration on the split road surface.

(2) The vehicle control apparatus 12 includes the limit portion 22 that limits the post-compensation driver request torque in such a manner that the difference between the driver request torque and the driving torque of the vehicle (the slip control torque—the BLSD request hydraulic pressure-corresponding torque) matches or falls below the driving torque lost due to the braking torque provided to the wheel on the low-μ road surface side according to the BLSD request hydraulic pressure.

Now, hypothetically supposing that the post-compensation driver request torque is not limited by the limit portion 22, this configuration would lead to application of the frictional brake to the wheel on the low-μ road surface side against the post-compensation driver request torque and thus a further addition of the driving torque to compensate for insufficiency corresponding to this loss, thereby ending up in a repetition of the torque addition. Therefore, the vehicle control apparatus 12 can prevent the post-compensation driver request torque from continuing increasing when the output driving torque exceeds the driving torque corresponding to the accelerator operation amount, by limiting the post-compensation driver request torque by the limit portion 22.

(3) The driving source is the motor 2.

As a result, the vehicle control apparatus 12 can improve responsiveness when converging the driving torque from the post-compensation driver request torque to the driver request torque, when the vehicle moves from the split road surface to the high-μ even road surface while being running at a constant acceleration, compared to when the vehicle is an engine vehicle.

(4) The driving torque lost due to the braking torque provided to the wheel on the low-μ road surface side according to the BLSD request hydraulic pressure is the value acquired by subtracting the difference between the slip control torque calculated by the slip control torque calculation processing portion 12d and the BLSD request hydraulic pressure-corresponding torque calculated by the BLSD request hydraulic pressure-corresponding torque calculation processing portion 17 from the driver request torque.

As a result, the vehicle control apparatus 12 can compensate for the driving torque that is lost due to the frictional brake in consideration of the slip control torque of the slip control.

(5) When reducing the braking torque according to the BLSD request hydraulic pressure toward zero at the time of the end of the BLSD control, the vehicle control apparatus 12 reduces the post-compensation driver request torque toward the driver request torque.

As a result, the vehicle control apparatus 12 can converge the driving torque from the post-compensation driver request torque to the driver request torque quickly at the same time as the exit from the split road surface and the start of the reduction in the frictional brake. In other words, the vehicle control apparatus 12 can prevent the longitudinal acceleration from changing between before and after the split road surface.

(6) The vehicle control apparatus 12 causes the braking torque and the post-compensation driver request torque to change in phase with each other when reducing the braking torque according to the BLSD request hydraulic pressure toward zero and reducing the post-compensation driver request torque toward the driver request torque at the time of the end of the BLSD control.

As a result, the vehicle control apparatus 12 can prevent the change in the longitudinal acceleration and the vibration of the driving system when the vehicle moves from the split road surface to the high-μ even road surface.

(7) The vehicle control apparatus 12 outputs the instruction for generating the higher driving torque than the driver request torque based on the accelerator operation to the motor 2 with the braking torque provided to the wheel on the low-μ road surface side due to the BLSD control on the split road surface.

As a result, the vehicle control apparatus 12 can prevent the reduction in the longitudinal acceleration on the split road surface.

Second Embodiment

A second embodiment has a basic configuration similar to the first embodiment, and therefore will be described focusing on only differences from the first embodiment.

Figure 10:
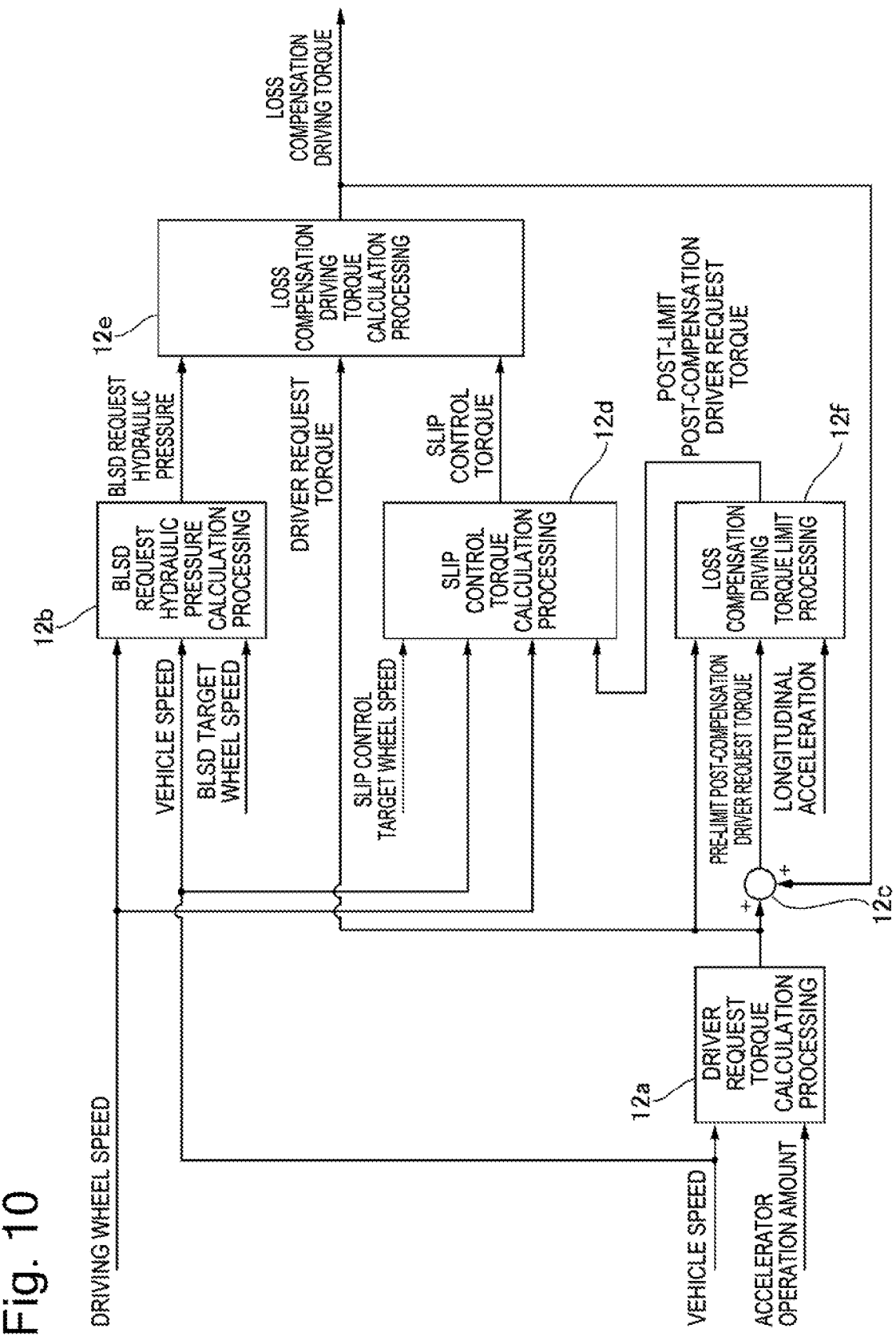
FIG. 10 is a control block diagram of a vehicle control apparatus 12 according to a second embodiment.

FIG. 10 is a control block diagram of a vehicle control apparatus 12 according to the second embodiment.

An addition portion 12c calculates a pre-limit post-compensation driver request torque by adding the loss compensation driving torque to the driver request torque.

Figure 11:
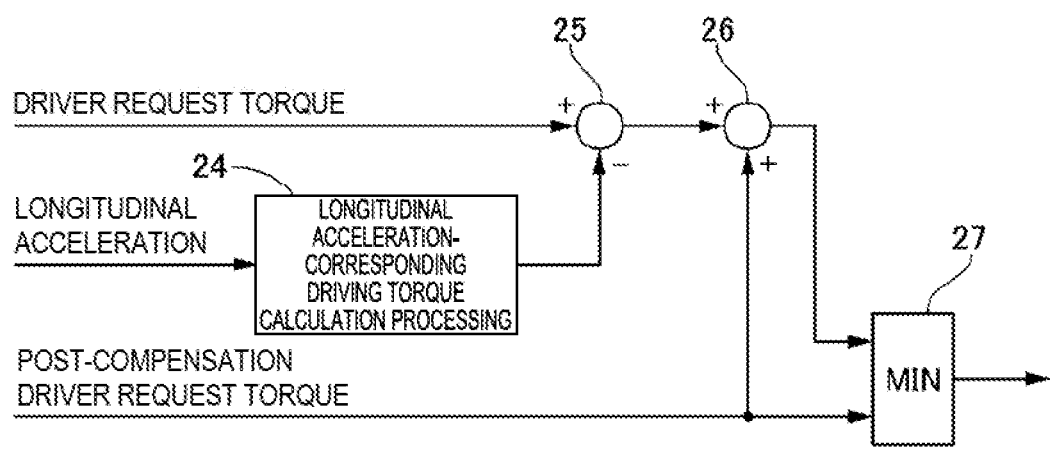
FIG. 11 is a control block diagram of a loss compensation driving torque limit processing portion 12f according to the second embodiment.

A loss compensation driving torque limit processing portion 12f calculates a post-limit post-compensation driver request torque based on the driver request torque, the longitudinal acceleration of the vehicle, and the pre-limit post-compensation driver request torque. A value detected by the longitudinal acceleration sensor is used as the longitudinal acceleration. FIG. 11 illustrates a control block diagram of the loss compensation driving torque limit processing portion 12f.

A longitudinal acceleration-corresponding driving torque calculation processing portion 24 calculates a longitudinal acceleration-corresponding driving torque, which is a driving torque converted from the longitudinal acceleration.

A comparison portion 25 calculates an insufficient acceleration-corresponding driving torque by reducing the longitudinal acceleration-corresponding driving torque from the driver request torque.

A comparison portion 26 calculates a post-compensation driver request torque limit value by adding the insufficient acceleration-corresponding driving torque to the pre-limit post-compensation driver request torque.

A limit portion (a second limiter processing portion) 27 sets a value selected by selecting the lower one of the post-compensation driver request torque and the post-compensation driver request torque limit value as the post-limit post-compensation driver request torque (second limiter processing step).

The slip control torque calculation processing portion 12d calculates the slip control torque for causing the wheel speeds of the front wheels 1FL and 1FR to match the slip control target wheel speed based on the slip control target wheel speed, the vehicle speed, the driving wheel speed, and the post-limit post-compensation driver request torque.

When attempting to control the slip of the wheel on the low-μ road surface side by the BLSD control while running on the split road surface, the vehicle experiences such a phenomenon that the braking torque requested by the BLSD control cannot be acquired due to insufficiency of the actual hydraulic pressure for the BLSD request hydraulic pressure, insufficiency of the braking torque for the actual hydraulic pressure, or the like. At this time, when the output torque of the motor 2 is controlled so as to compensate for the lost driving torque due to the BLSD control by the request driving torque correction control, a driving torque exceeding the driver request may be generated because the driving torque is compensated for more than the actual lost driving torque. This leads to generation of a longitudinal acceleration higher than expected by the driver depending on the road surface condition on the split road surface where the high-μ road surface and the low-μ road surface are mixed, and therefore some measures should be taken against it.

In the second embodiment, an upper limit on the post-compensation driver request torque is limited by the post-compensation driver request torque limit value. The post-compensation driver request torque limit value is calculated by adding the post-compensation driver request torque to the driving torque corresponding to the insufficient acceleration acquired by subtracting the longitudinal acceleration-corresponding driving torque from the driver request torque. The longitudinal acceleration-corresponding driving torque is the actual driving force of the vehicle, and therefore the vehicle control apparatus 12 can prevent the generation of the longitudinal acceleration exceeding the driver request by setting the upper limit on the post-compensation driver request torque to the post-compensation driver request torque limit value.

Figure 12:
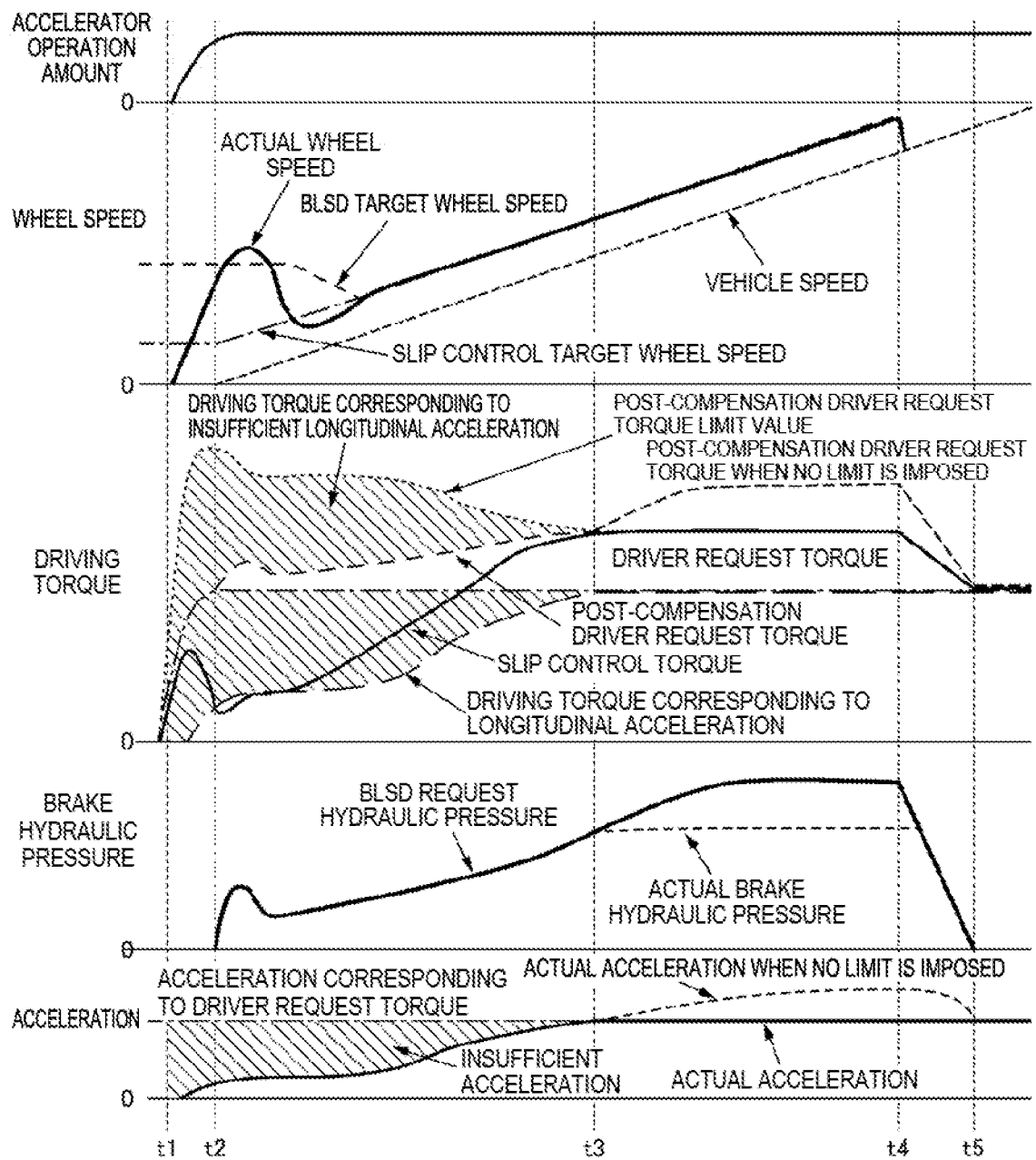
FIG. 12 is a timing chart of request driving torque correction control according to the second embodiment when the vehicle starts running on the split road surface.

FIG. 12 is a timing chart of request driving torque correction control according to the second embodiment when the vehicle starts running on the split road surface. Suppose that the split road surface is the low-μ road surface on the front right wheel side and is the high-μ road surface on the front left wheel side.

The timing chart exhibits the same content as in FIG. 6 during a period since time t1 to time t3, but the post-compensation driver request torque limit value for limiting the upper limit on the post-compensation driver request torque is set in the second embodiment. The post-compensation driver request torque limit value is calculated by adding the driving torque corresponding to the insufficient longitudinal acceleration, which is the difference between the driver request torque and the longitudinal acceleration-corresponding driving torque, to the post-compensation driver request torque.

At time t3, the actual brake hydraulic pressure starts failing to keep up with the BLSD request hydraulic pressure. At this time, if the post-compensation driver request torque limit value is not set, the post-compensation driver request torque would exceed the actual lost torque due to the BLSD control, and therefore the set slip control torque would exceed the driver request. As a result, the actual longitudinal acceleration would exceed the acceleration corresponding to the driver request torque, and therefore the generated longitudinal acceleration would exceed the driver request.

On the other hand, in the second embodiment, the upper limit on the post-compensation driver request torque is limited by the post-compensation driver request torque limit value, so that the increase in the post-compensation driver request torque is restricted (prohibited) when the driving torque corresponding to the insufficient longitudinal acceleration disappears. As a result, the vehicle control apparatus 12 can prevent the occurrence of the longitudinal acceleration exceeding the driver request.

The second embodiment brings about the following advantageous effects.

(8) The vehicle control apparatus 12 includes the limit portion 27 that limits the post-compensation driver request torque based on the post-compensation driver request torque limit value, which is acquired by adding the difference between the driver request torque calculated by the driver request torque calculation processing portion 12a and the longitudinal acceleration-corresponding driving torque (the value of the driving torque converted from the longitudinal acceleration of the vehicle) calculated by the longitudinal acceleration-corresponding driving torque calculation processing portion 24, to the driver request torque.

As a result, the vehicle control apparatus 12 can prevent the occurrence of the longitudinal acceleration exceeding the driver request.

Other Embodiments

Having described the embodiments for implementing the present invention, the specific configuration of the present invention is not limited to the configurations of the embodiments, and the present invention also includes a design modification and the like thereof made within a range that does not depart from the spirit of the present invention.

The driving source may be an engine, or a combination of an engine and an electric motor. In other words, the present invention can also be applied to an engine vehicle and a hybrid vehicle.

Next, a method for determining whether the constituent features (the technical scope) of the present invention are satisfied based on a vehicle behavior will be described (this method can be restated as a method for discovering infringement of the right of the present invention).

First, a vehicle equipped with a control apparatus deemed to satisfy the constituent features (the technical scope) of the present invention (infringe the right) is prepared. The control apparatus is a control apparatus capable of performing so-called LSD control, which performs differential control of the left and right driving wheel by the brake.

The above-described vehicle is driven to run at a constant acceleration on a test course in which the split road surface and the high-μ even road surface are set. At this time, if the longitudinal acceleration hardly changes (strictly speaking, the longitudinal acceleration slightly changes for only a moment) when the vehicle moves from the split road surface to the high-μ even road surface with the brake LSD control actuated, it is apparent that the output driving torque is higher than the driver request torque based on the acceleration operation, and therefore this control apparatus can be determined to satisfy the constituent features of the present invention. The conventional control apparatus performs control so as not to exceed the driver request torque during the BLSD control, and therefore leads to a considerable change in the longitudinal acceleration when the vehicle exits the split road surface.

In the following description, technical ideas recognizable from the above-described embodiments will be described.

A control apparatus for a vehicle, in one configuration thereof, includes a driving source configured to provide a driving torque to a driving axle connecting a first driving wheel and a second driving wheel of the vehicle to each other, a brake apparatus capable of providing braking torques to the first driving wheel and the second driving wheel individually, a request driving torque calculation portion configured to calculate a request driving torque of the vehicle based on an accelerator operation, a frictional brake calculation portion configured to calculate the braking torque to provide to the first driving wheel by the brake apparatus on a split road surface on which a frictional coefficient of a road surface where the first driving wheel contacts a ground is lower than a frictional coefficient of a road surface where the second driving wheel contacts the ground, and a correction request driving torque output portion configured to output a correction request driving torque, which is acquired by adding a driving torque lost due to the braking torque calculated by the frictional brake calculation portion to the request driving torque calculated by the request driving torque calculation portion, to the driving source.

According to a further preferable configuration, the above-described configuration further includes a first limiter processing portion configured to limit the correction request driving torque in such a manner that a difference between the request driving torque calculated by the request driving torque calculation portion and a driving torque of the vehicle matches or falls below the driving torque lost due to the braking torque calculated by the frictional brake calculation portion.

According to another preferable configuration, in any of the above-described configurations, the driving source is a motor.

According to further another preferable configuration, any of the above-described configurations further includes a slip control portion configured to prevent a slip of the first driving wheel by controlling an output torque of the motor. The lost driving torque is a value acquired by subtracting a difference between the driving torque generated due to the control on the output torque of the motor by the slip control portion and the driving torque lost due to the braking torque calculated by the frictional brake calculation portion from the request driving torque.

According to further another preferable configuration, in any of the above-described configurations, the control apparatus for the vehicle reduces the correction request driving torque to output to the driving source by the correction request driving torque output portion toward the request driving torque when reducing the braking torque to provide to the first driving wheel by the brake apparatus toward zero.

According to further another preferable configuration, in any of the above-described configurations, the control apparatus for the vehicle changes the braking torque to provide to the first driving wheel by the brake apparatus and the correction request driving torque to output to the driving source by the correction request driving torque output portion in phase with each other, when reducing the braking torque toward zero and reducing the correction request driving torque toward the request driving torque.

According to further another preferable configuration, any of the above-described configurations further includes a second limiter processing portion configured to limit the correction request driving torque based on a limit value acquired by adding a difference between the request driving torque calculated by the request driving torque calculation portion and a value of a driving torque converted from a longitudinal acceleration of the vehicle to the request driving torque calculated by the request driving torque calculation portion.

Further, from another aspect, a control apparatus for a vehicle, in one configuration thereof, includes a driving source configured to provide a driving torque to a driving axle connecting a first driving wheel and a second driving wheel of the vehicle to each other, and a brake apparatus capable of providing braking torques to the first driving wheel and the second driving wheel individually. The control apparatus for the vehicle outputs an instruction for generating a higher driving torque than a request driving torque of the vehicle based on an accelerator operation to the driving source with the braking torque provided to the first driving wheel by the brake apparatus on a split road surface on which a frictional coefficient of a road surface where the first driving wheel contacts a ground is lower than a frictional coefficient of a road surface where the second driving wheel contacts the ground.

Preferably, in the above-described configuration, the control apparatus for the vehicle outputs the driving torque to the driving source by adding a driving torque lost due to the braking torque provided to the first driving wheel by the brake apparatus to the request driving torque.

According to another preferable configuration, in any of the above-described configurations, the control apparatus for the vehicle imposes a limit in such a manner that a difference between the request driving torque and a driving torque of the vehicle matches or falls below the lost driving torque.

According to further another preferable configuration, in any of the above-described configurations, the control apparatus for the vehicle reduces a higher driving torque than the request driving torque toward the request driving torque when reducing the braking torque provided to the first driving wheel by the brake apparatus toward zero.

According to further another preferable configuration, in any of the above-described configurations, the control apparatus for the vehicle limits the instruction to output to the driving source based on a limit value acquired by adding a difference between the request driving torque and a value of a driving torque converted from a longitudinal acceleration of the vehicle to the request driving torque.

Further, from another aspect, a control system for a vehicle, in one configuration thereof, includes a driving source configured to provide a driving torque to a driving axle connecting a first driving wheel and a second driving wheel of the vehicle to each other, a brake apparatus capable of providing braking torques to the first driving wheel and the second driving wheel individually, and a control unit configured to control the driving source and the brake apparatus. The control unit outputs an instruction for generating a driving torque exceeding a request driving torque of the vehicle based on accelerator steering to the driving source with the braking torque provided to the first driving wheel by the brake apparatus on a split road surface on which a frictional coefficient of a road surface where the first driving wheel contacts a ground is lower than a frictional coefficient of a road surface where the second driving wheel contacts the ground.

Preferably, in the above-described configuration, the control unit limits the instruction to output to the driving source in such a manner that a difference between the request driving torque and a driving torque of the vehicle matches or falls below a driving torque lost due to the braking torque provided to the first driving wheel by the brake apparatus.

According to another preferable configuration, in any of the above-described configurations, the driving source is a motor.

According to further another preferable configuration, in any of the above-described configurations, the control system for the vehicle reduces a higher driving torque than the request driving torque toward the request driving torque when reducing the braking torque provided to the first driving wheel by the brake apparatus toward zero.

According to further another preferable configuration, in any of the above-described configurations, the control system for the vehicle limits the instruction to output to the driving source based on a limit value acquired by adding a difference between the request driving torque and a value of a driving torque converted from a longitudinal acceleration of the vehicle to the request driving torque.

Further, from another aspect, a control method for a vehicle, in one configuration thereof, includes the step of calculating a request driving torque of the vehicle based on an accelerator operation, the step of calculating a braking torque to provide to the first driving wheel by a brake apparatus capable of providing braking torques to the first driving wheel and the second driving wheel individually on a split road surface on which a frictional coefficient of a road surface where the first driving wheel of the vehicle contacts a ground is lower than a frictional coefficient of a road surface where the second driving wheel of the vehicle connected to the first driving wheel via a driving axle contacts the ground, and the step of outputting a correction request driving torque, which is acquired by adding a driving torque lost due to the braking torque calculated by the frictional brake calculation step to the request driving torque calculated by the request driving torque calculation step, to a driving source configured to provide a driving torque to the driving axle as a correction request driving torque output.

Preferably, the above-described configuration further includes the step of limiting the correction request driving torque in such a manner that a difference between the request driving torque calculated by the request driving torque calculation step and a driving torque of the vehicle matches or falls below the driving torque lost due to the braking torque calculated by the frictional brake calculation step.

According to another preferable configuration, in any of the above-described configurations, the control method for the vehicle reduces the correction request driving torque to output to the driving source by the correction request driving torque output step toward the request driving torque when reducing the braking torque to provide to the first driving wheel by the brake apparatus toward zero.

According to further another preferable configuration, any of the above-described configurations further includes a second limiter processing step of limiting the correction request driving torque based on a limit value acquired by adding a difference between the request driving torque calculated by the request driving torque calculation step and a value of a driving torque converted from a longitudinal acceleration of the vehicle to the request driving torque calculated by the request driving torque calculation step.

The present invention is not limited to the above-described embodiments, and includes various modifications. For example, the above-described embodiments have been described in detail to facilitate better understanding of the present invention, and the present invention shall not necessarily be limited to the configurations including all of the described features. Further, a part of the configuration of some embodiment can be replaced with the configuration of another embodiment. Further, some embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2017-153896 filed on Aug. 9, 2017. The entire disclosure of Japanese Patent Application No. 2017-153896 filed on Aug. 9, 2017 including the specification, the claims, the drawings, and the abstract is incorporated herein by reference in its entirety.

REFERENCE SIGN LIST

1FL, 1FR front wheel
1RL, 1RR rear wheel
2 motor (driving source)
5FL, 5FR driving axle
11FL, 11FR, 11RL, 11RR brake unit (brake apparatus)
12 vehicle control apparatus (control unit)
12a driver request torque calculation processing portion (request driving torque calculation portion)
12b BLSD request hydraulic pressure calculation processing portion (frictional brake calculation portion)
12c addition portion (correction request driving torque output portion)
12d slip control torque calculation processing portion (slip control portion)
22 limit portion (first limiter processing portion)
27 limit portion (second limiter processing portion)

The invention claimed is:

1. A system for a vehicle, comprising:
an accelerator;
a first driving wheel;
a second driving wheel;
a driving axle connecting the first driving wheel and the second driving wheel;
a driving source configured to provide a driving torque to the driving axle;
a brake apparatus configured to provide braking torques to the first driving wheel and the second driving wheel individually; and
a vehicle control apparatus operatively connected to the driving source and to the brake apparatus, and configured to:
  (a) calculate a driver request torque based on an operation amount of the accelerator and a vehicle speed;
  (b) when the vehicle is on a split road surface, the split road surface being a road surface on which a frictional coefficient of a road surface where the first driving wheel contacts a ground is lower than a frictional coefficient of a road surface where the second driving wheel contacts the ground:
    calculate a BLSD request hydraulic pressure to provide to the first driving wheel,
    calculate a braking torque corresponding to the BLSD request hydraulic pressure,
    calculate a loss compensation driving torque resulting from the BLSD request hydraulic pressure,
    double the loss compensation driving torque,
    calculate a post-compensation driver request torque by adding the doubled loss compensation driving torque to the driver request torque, and
    apply the post-compensation driver request torque to the driving source.

2. The system according to claim 1, wherein the vehicle control apparatus is configured to limit the post-compensation driver request torque such that a difference between the driver request torque and a driving torque of the vehicle matches or falls below the driving torque lost due to the braking torque.

3. The system according to claim 1, wherein the driving source is a motor.

4. The system according to claim 3, wherein
the vehicle control apparatus is further configured to prevent a slip of the first driving wheel by controlling an output torque of the motor, and
the driving torque lost due to the braking torque is calculated by subtracting a difference between a slip control torque and a braking torque corresponding to the BLSD request hydraulic pressure from the driver request torque.

5. The system according to claim 1, wherein the vehicle control apparatus is further configured to reduce the post-compensation driver request torque toward the driver request torque when reducing the braking torque provided to the first driving wheel by the brake apparatus toward zero.

6. The system according to claim 5, wherein the vehicle control apparatus is further configured to reduce the braking torque and the post-compensation driver request torque in phase with each other.

7. The system according to claim 1, wherein
the vehicle control apparatus is further configured to limit the post-compensation driver request torque based on a limit value calculated by adding a difference between the driver request torque and a converted driving torque, and
wherein the converted driving torque is a torque value converted from a longitudinal acceleration of the vehicle.

8. A method for controlling a vehicle, comprising:
providing a vehicle having an accelerator, a first driving wheel, a second driving wheel, a driving axle connecting the first driving wheel and the second driving wheel, a driving source configured to provide a driving torque to the driving axle, and a brake apparatus configured to provide braking torques to the first driving wheel and the second driving wheel individually;
providing a vehicle control apparatus operatively connected to the driving source and the brake apparatus;
calculating, by the vehicle control apparatus, a driver request torque based on an operation amount of the accelerator and a vehicle speed;
when the vehicle is on a split road surface, the split road surface being a road surface on which a frictional coefficient of a road surface where the first driving wheel contacts a ground is lower than a frictional coefficient of a road surface where the second driving wheel contacts the ground:
calculating a BLSD request hydraulic pressure to provide to the first driving wheel, calculating a braking torque corresponding to the BLSD request hydraulic pressure, calculating a loss compensation driving torque based on the braking torque, doubling the loss compensation driving torque, calculating a post-compensation driver request torque by adding the doubled loss compensation driving torque to the driver request torque, and applying the post-compensation driver request torque to the driving source.

9. The method according to claim 8, further comprising limiting the post-compensation driver request torque such that a difference between the driver request torque and a driving torque of the vehicle matches or falls below the driving torque lost due to the braking torque.

10. The method according to claim 8, wherein the driving source is a motor.

11. The method according to claim 10, further comprising: controlling an output torque of the motor to prevent a slip of the first driving wheel, wherein the driving torque lost due to the braking torque is calculated by subtracting a difference between a slip control torque and a braking torque corresponding to the BLSD request hydraulic pressure from the driver request torque.

12. The method according to claim 8, further comprising: reducing the post-compensation driver request torque toward the driver request torque when reducing the braking torque provided to the first driving wheel by the brake apparatus toward zero.

13. The method according to claim 12, further comprising: reducing the braking torque and the post-compensation driver request torque in phase with each other.

14. The method according to claim 8, further comprising: limiting the post-compensation driver request torque based on a limit value, wherein the limit value is calculated by adding a difference between the driver request torque and a converted driving torque, and the converted driving torque is a torque value converted from a longitudinal acceleration of the vehicle.

* * * * *